United States Patent [19]

Van Der Loos

[11] 3,879,323

[45] Apr. 22, 1975

[54] PROCESS FOR PREPARING A MIXTURE OF BITUMEN, A HIGH-BOILING HYDROCARBON AND A RUBBER-LIKE COPOLYMER OF ETHYLENE, AT LEAST ONE OTHER ALPHA-ALKENE AND, IF NECESSARY, ONE OR MORE POLYENES

[75] Inventor: Jozef L. M. Van Der Loos, Sittard, Netherlands

[73] Assignee: Stamicarbon, B.V., Geleen, Netherlands

[22] Filed: Sept. 18, 1973

[21] Appl. No.: 398,438

[30] Foreign Application Priority Data

Sept. 22, 1972 Netherlands.................... 7212825
Apr. 26, 1973 Netherlands.................... 7305810

[52] U.S. Cl.................. 260/28.5 AS; 260/33.6 AQ
[51] Int. Cl............................................ C08c 11/70
[58] Field of Search............. 260/28.5 AS, 33.6 AO

[56] References Cited
UNITED STATES PATENTS 2,834,742   5/1958   Scott et al.................... 260/28.5 AS
3,336,252   8/1967   Raichle et al................ 260/28.5 AS

FOREIGN PATENTS OR APPLICATIONS 1,304,238   1/1973   United Kingdom.......... 260/28.5 AS

*Primary Examiner*—Melvyn I. Marquis
*Attorney, Agent, or Firm*—Cushman, Darby & Cushman

[57] ABSTRACT

A mixture containing bitumen, a high-boiling hydrocarbon and an EPDM-rubber is prepared by dissolving the EPDM under special conditions in the hydrocarbon and by subsequently mixing the resulting solution with bitumen. An improved bitumen is obtained that can be applied, for instance, in road construction.

Preferably during the dissolution of EPDM in hydrocarbon, oxygen is incorporated into the mixture in a forced manner in order to achieve improved dispersion.

14 Claims, No Drawings

PROCESS FOR PREPARING A MIXTURE OF BITUMEN, A HIGH-BOILING HYDROCARBON AND A RUBBER-LIKE COPOLYMER OF ETHYLENE, AT LEAST ONE OTHER ALPHA-ALKENE AND, IF NECESSARY, ONE OR MORE POLYENES

The invention relates to a process for preparing a mixture of bitumen, a high-boiling hydrocarbon and a rubber-like copolymer of ethylene, at least one other α-alkene and, if necessary, one or more polyenes.

Owing to the attractive combination of physical and mechanical properties, bitumen has of old been applied in large quantities in road construction as a binding agent. The enormous proportions road traffic has assumed during the last few decades has considerably increased the demands made on a modern road-system. This has led to the properties of the bitumen applied of old now being considered insufficient in certain cases. This applies, notably, to the application of bitumen as a binder in the construction of roads on which traffic is of a high intensity and which are regularly subjected to high loads, particularly if, in addition, great temperature fluctuations occur thereby. The shortcomings of the bitumen here principally relate to the softening point, the elasticity and the brittleness temperature.

For a considerable time already it has been known that these very properties can be influenced favourably by incorporation of natural or synthetic rubber-like polymers.

Since the thirties it has been proposed for bitumen to be modified by incorporation of, amongst others, natural rubber, nitrile rubber, diene rubbers, like polybutadiene and copolymers of butadiene and styrene, polychloroprene, butyl rubber, copolymers of ethylene and vinyl acetate, atactic polybutylene-1 and rubber-like copolymers of ethylene, at least one other α-alkene and, if necessary, one or more polyenes.

Bitumen applied in road construction is, mostly for a longer time, stored at elevated temperatures and, prior to use, is usually mixed with a filler at high temperatures in contact with air. Such treatments make high demands on the bitumen modified with rubber-like polymer as regards thermal stability and resistance against the action of oxygen and ozone. Therefore, high demands should also be made on the rubber-like polymer to be incorporated into the bitumen. For this reason there is a clear preference for application of rubber-like copolymers of ethylene, at least one other α-alkene and, if necessary, one or more polyenes. Copolymers of this kind possess a remarkable resistance against ageing and the action of oxygen and ozone.

The extent to which the properties of bitumen can be improved through incorporation of rubber-like polymers strongly depends on the distribution of the polymer in the bitumen and the degree of compatibility of the bitumen with the rubber-like polymer. To increase the compatibility it has been proposed to incorporate also a high-boiling hydrocarbon into the bitumen, in addition to the rubber-like polymer. Quite a lot of attention has been paid to development of a commercially applicable mixing method for incorporation of the rubber-like polymer into bitumen. A multitude of processes for this purpose has been proposed. For instance, it has been proposed for the rubber-like polymer to be incorporated into molten bitumen in the form of crumb, with intensive stirring. However, in order to achieve a useful distribution of the polymer in the bitumen, such a process calls for very long mixing times. It has been tried to reduce the mixing times necessary in a process of this kind by bringing the polymer in a more finely divided condition before the incorporation into the bitumen. For instance, it has been proposed, amongst others, the cause the rubber-like polymer to deposit on a finely divided, preferably porous, filler. In order for a proper adhesion between the filler and the polymer to be obtained, said filler should first be treated with an adhesive. The freely flowing filler powder that can be obtained in this way, which contains rubber-like polymer and which may also contain a high-boiling hydrocarbon, should subsequently be mixed with molten bitumen. Such a process, however, is too expensive for application on an industrial scale. Another process based on this idea consists of the addition of the rubber-like polymer, in the form of a latex, to the molten bitumen. However, a process of this kind is unattractive because a lot of energy is lost through the evaporation of the water present in the latex and because of the hindrance experienced on account of the large amounts of superheated water vapour forming in such a process. In this kind of process there is also a strong tendency towards foaming and premature coagulation of the rubber-like polymer out of the latex. If such a process would be applied for incorporation of a rubber-like copolymer of ethylene, at least one other α-alkene and, if necessary, one or more polyenes, there will be the additional disadvantage that first a latex would have to be prepared from this polymer. It is known that rubber-like copolymers of this kind are usually prepared in solution. A laticifying treatment is expensive and would have a strong costprice-increasing effect. Also high costs of transportation will occur if the bitumens are modified in a place which is not located in the immediate vicinity of the laticifying installation. Further it has been proposed to add an oil to a latex of a rubber-like polymer and to add the water-containing emulsion of rubber-like polymer and oil so obtained to molten bitumen. Such a process, too, has the abovementioned disadvantages. It has also been proposed for a rubber-like polymer to be incorporated into bitumen by first preparing a dispersion of the rubber-like polymer in a high-boiling hydrocarbon at a temperature of between 85° and 110°C and by subsequently incorporating this dispersion into bitumen. Further it has been proposed to prepare a master batch of rubber-like polymer and part of the bitumen by intensively kneading the two components in a suitable installation and, subsequently, to mix the solid mass so obtained with the remaining amount of bitumen. In a process of this kind one can also start from a rubber-like polymer extended with oil, which can contain at most 150% by weight of oil, referred to the rubber-like polymer. A master batch can also be prepared from a rubber-like polymer and a high-boiling hydrocarbon by intensively kneading the rubber-like polymer with up to 200% by weight of oil, referred to the polymer, and by mixing the solid mass so obtained with the bitumen. Such processes, too, do not lend themselves for application on a commercial scale.

The lack of a good process by which it is possible to mix bitumen with rubber-like polymers on a commercial scale is one of the most important factors which have so far limited the use of bitumen modified with rubber-like polymers.

The object of the invention is to provide a process for preparing a mixture of bitumen, a high-boiling hydrocarbon and a rubber-like copolymer of ethylene, at least one other α-alkene and, if necessary, one or more polyenes, which can be applied on a commercial scale and with which a proper distribution of the rubber-like copolymer in the bitumen can be effected in a simple and cheap manner.

The process according to the invention for preparing a mixture of bitumen, a high-boiling hydrocarbon and a rubber-like copolymer of ethylene, at least one other α-alkene and, if necessary, one or more polyenes, is characterized in that bitumen having a temperature of between 160° and 260°C is mixed with 0.1 to 25% by weight — referred to the bitumen — of the rubber-like copolymer in the form of a solution of this copolymer prepared at a temperature of between 160° and 260°C in — referred to the copolymer — 300 to 1,000% by weight of the high-boiling hydrocarbon, which solution has a viscosity of at most 250 P, measured at 200°C.

It was also found that, in order to obtain a low viscosity, oxygen or gas mixtures containing oxygen should, in a forced manner, by contacted with the solution during the preparation of the solution of the copolymer in the high-boiling hydrocarbon.

By the term 'forced' is understood any measure involving an increased transfer of oxygen from the gas phase to the solution; like an increase of the partial oxygen pressure, turbulence of the gas phase and/or solution, an increase of the contact surface area, the use of larger quantities of oxygen, and other measures well known to one skilled in the art.

Although in experiments carried out on a sufficiently small scale it will often suffice to simply conduct the experiments in the air to obtain a solution with a sufficiently low viscosity, this is not possible upon realization on a larger scale.

However, even upon realization on a small scale it has appeared possible to reduce the viscosity of the solution strongly by bringing it in forced contact with oxygen or oxygen-containing gas at 160°–260°C, for instance by passing air through it.

With the aid of this it is possible, the viscosity remaining the same, to prepare solutions of higher concentrations, whilst the pumpability and the dispersing effect remain the same. As a result of this it is also possible to realize a previously determined viscosity of the solution which is the most suitable for incorporation of the solution into the bitumen and for improvement of the properties of the bitumen prepared, without having to abandon other optimum conditions, like the ratio between the quantities of oil and copolymer, or the kind of copolymer.

For bitumen, in the process according to the invention, any kind of bitumen may be started from, independent of the origin or the method of preparation. Examples of bitumens which may be applied are, amongst others, distillate-bitumen, blown bitumen, high-vacuum bitumen and mixed bitumen. By preference, in the method of preparation according to the invention, distilled bitumen is started from, particularly bitumen with a penetration of 16–21 mm at 25°C, a softening point (ring-and-ball) of between 37 and 44°C and a breaking point according to Fraass of at most −15°C. Bitumens of this kind are usually indicated according to DIN 1995 as B 200 bitumens.

The ethylene copolymers applicable according to the invention may be composed of ethylene, at least one other α-alkene and, if necessary, one or more polyenes. For the other α-alkene, any copolymerizable α-alkene may be applied in the copolymer, but preferably those which contain 3 to 8 carbon atoms per molecule, particularly propylene and butylene-1. Also mixtures of such α-alkenes may have been incorporated into the ethylene copolymers, like mixtures of propylene and butylene-1.

The ethylene copolymers applicable according to the invention may contain one or more polyenes, in addition to one or more other α-alkenes. For polyenes, a multitude of compounds are applicable. Examples of suitable polyenes are, amongst others, linear dienes with 4 to 24 carbon atoms to every molecule, and more particularly 4 to 12 carbon atoms per molecule, such as butadiene-1,3, hexadiene-1,4, hexadiene-1,5, octadiene-1,4, octadiene-1,5, cyclic polyenes with, preferably, 6 to 24, and more particularly 6 to 12 carbon atoms per molecule, like cyclooctadiene-1,4, cyclooctadiene-1,5 and 5-methyl- and 6-methyl-4,7,8,9-tetrahydroindene and, further, cyclic dienes provided with an endomethylene bridge with, preferably, 7 to 24, and more particularly 8 to 18 carbon atoms per molecule, like 5-methylenenorbornene-2, 5-ethylidenenorbornene-2, 5-propylidenenorbornene-2, 5-isopropylidenenorbornene-2, 5-(2-methyl-2-butenyl)norbornene-2, 5-vinylnorbornene-2 and dicyclopentadiene.

By preference, in the process according to the invention, a solution of a rubber-like copolymer and ethylene is started from, into which, as polyene, dicyclopentadiene is incorporated. The quantity of polyene in the rubber-like copolymer of ethylene may vary within wide limits. Preferably, however, an amount of 0.1 to 10% by weight is applied.

The rubber-like copolymers of ethylene, which may be applied according to the invention, as a rule contain between 20 and 75% by weight of ethylene, between 24 and 79% by weight of one or more other α-alkenes and between 1–10% by weight of one or more polyenes.

As high-boiling hydrocarbon, which may be applied in the process according to the invention, particularly the hydrocarbon or hydrocarbon mixtures which have a flash point above 200°C, and more particularly above 250°C, are suitable. Highly suitable are those fractions which are known in the petrochemical industry by the name of aromatic extract. Suitable are, amongst others, aromatic-naphthenic hydrocarbon mixtures like furfurol extracts from the lubricating-oil refinery.

A good processibility calls for the solution of rubber-like copolymers of ethylene, at least one other α-alkene and, if necessary, one or more polyenes in high-boiling hydrocarbons, to contain 300 to 1000, and more particularly 400 to 800% by weight of the high-boiling hydrocarbon, referred to the copolymer. Such solutions, which are highly viscous at room temperature, are well processable at temperatures in excess of 160°C as a result of a relatively low viscosity. As a rule, the viscosity of these solutions, measured at 200°C, is lower than 250 P and, mostly, even lower than 200 P, which makes it possible for such solutions to be stirred and, even, pumped.

If less than 300% by weight of the high-boiling hydrocarbon, referred to the rubber-like copolymer, is applied in the solution, these solutions will not have such a good processability because of too high a viscosity. If more than 1000% by weight of the high-boiling hydrocarbon, referred to the copolymer, is applied in the solution, this will have a detrimental influence on the properties of bitumen modified with a solution of this kind. Prior to being added to the bitumen, the solution of rubber-like copolymer in a high-boiling hydrocarbon should have been given a temperature of between 160° and 260°C.

Only if such a pre-heating is applied will the viscosity of these solutions be sufficiently low to allow their being added to the bitumen in a simple way, for instance by pumping, and will the solution be rapidly taken up by the bitumen.

The solutions of rubber-like copolymer in a high-boiling hydrocarbon, which can be applied according to the invention, are prepared by incorporating the rubber-like copolymer, preferably in finely divided state, like that of granulate or crumb, into the hydrocarbon at an elevated temperature, particularly at temperatures of between 160° and 260°C. Since crumb or granulate of rubber-like ethylene copolymers is usually sticky to some degree, crumb which has been coated, for instance, with talcum or polyethylene powder can be applied to advantage. The incorporation of the copolymer into the hydrocarbon is preferably carried out with stirring.

It is also possible to prepare such solutions in other ways, for instance by joining the hydrocarbon and a solution of the rubber-like ethylene copolymer in a relatively low-boiling organic solvent and to remove the solvent of the ethylene copolymer from the resulting mixture by evaporation. In such a process, a solution of the ethylene copolymer can be applied to advantage in the state it has been obtained in during its preparation by polymerization of ethylene, at least one other α-alkene and, if necessary, one or more polyenes.

In the process according to the invention the bitumen is mixed with 0.1 to 25, and preferably 1 to 15% by weight – referred to the bitumen – of the solution of the copolymer in the high-boiling hydrocarbon.

The mixing of the bitumen and the solution of the rubber-like ethylene copolymer in the high-boiling hydrocarbon is preferably carried out with vigorous stirring, but this is not essential.

The whole quantity of the solution of the rubber-like copolymer may be joined with the bitumen either at once or portion-wise.

The mixtures of bitumen, high-boiling hydrocarbon and rubber-like copolymer of ethylene, at least one other α-alkene and, if necessary, one or more polyenes, which mixtures are obtained by the process according to the invention, may to advantage be blown with oxygen or an oxygen-containing gas mixture, like air. Such a blowing treatment can be carried out in two steps to advantage, viz. a first step at a temperature of between 160° and 230 °C and a second step at a temperature of between 230° and 260 °C.

The blowing time, amongst others, depends on the blowing temperature, the nature of the applied bitumen, the hydrocarbon and the mixing ratios of the bitumen, hydrocarbon and rubber-like polymer, and on the quantity of oxygen applied for the blowing per unit of time, said blowing time, generally, lying between 2 and 8 hours however.

Also sulphur may be applied to advantage to the mixtures prepared according to the invention. The sulphur may be incorporated into the bitumen both before the mixing and after the mixing with the rubber-like polymer. Good results are obtained with 1 to 4 parts by weight of sulphur to every part of rubber-like copolymer.

It has appeared that, by including also a polyolefin in the composition of bitumen, rubber-like copolymer and hydrocarbon, the physical and mechanical properties of the mixture can be improved still further. By preference, high-density polyethylene prepared according to the Ziegler process is used in a quantity of 1 to 3 parts by weight per 100 parts of the ultimate mixture.

The modified bitumen mixtures obtained can be applied to advantage not only in road construction but also in other places where bitumens have so far been applied, like roofings, bottoms and walls of reservoirs, ponds, seals, joining strips, insulating materials and impregnating materials, possibly mixed with non-blown bitumen and/or other additions.

The aim of the following examples is to elucidate the invention in more detail, without limiting it in any way.

EXAMPLE I 1000 g of a rubber-like copolymer of ethylene, propylene and dicyclopentadiene were added in the form of small pieces, with stirring, to a 10-litre beaker containing 4000 g of a high-boiling hydrocarbon with a temperature of 220°C. For the rubber-like copolymer, a copolymer was applied which is to be had under the trade-mark of "KELTAN 520" and which is composed of 56.8% by weight of ethylene, 39% by weight of propylene and 4.2% by weight of dicyclopentadiene, with a Mooney viscosity (ML 4–125°C) of 50.

As high-boiling hydrocarbon a hydrocarbon was applied which was, principally, aromatic-naphtenic, had a flash point of 263°C, and had been obtained under the trade mark of "SUNTHENE 4240". After 2 hours of stirring, the temperature being kept at 220°C, the rubber-like copolymer had become completely dissolved in the hydrocarbon. The solution obtained in this way had a viscosity of 85 Poise, measured at 200°C and a rate of shear of 8 sec$^{-1}$, and was well pumpable.

After this solution had cooled to room temperature, it had such a high viscosity that it showed only a small flow.

50 parts by weight of this solution of rubber-like copolymer and 50 parts by weight of a B 200 bitumen, commercially available under the trade mark of "BP B 200," were subsequently brought to a temperature of 200°C. Next, whilst stirring, the solution of rubber-like copolymer was slowly poured into the bitumen. After 1 hour of stirring, the solution of the copolymer was homogeneously distributed in the bitumen to the naked eye. Also upon microscopic examination of the modified bitumen prepared in this way, the enlargement applied amounting to 24 times, the rubber-like copolymer appeared to be homogeneously distributed in the bitumen.

EXAMPLE II

Example I was repeated, the difference being that it was seen to, with the aid of nitrogen gas, that no air could get into contact with the solution.

A solution was obtained having a viscosity of 115 Poise, measured at 200°C and a rate of shear of 8 sec$^{-1}$.

EXAMPLE III

Example I was repeated. However, air was made to bubble through the solution.

The resulting solution had a viscosity of 60 Poise, measured at 200°C and 8 sec$^{-1}$.

EXAMPLE IV 6 kg of an EPDM rubber, available under the trade mark of "KELTAN 320," with a Mooney viscosity (ML 4-125°) of 36, was added, in the form of crumbs having a diameter of 5–10 mm, to a vessel of 100 litres containing 30 kgs of an aromatic lubricating oil.

The properties of the oil used were as follows:
aromatic content 40%
flash point 275°C
vapour pressure 10 mm Hg (300°C)
viscosity 4.5 cP (200°C); 7 cP (150°C).

With application of nitrogen, stirring was carried out for 9 hours, the revolutions per minute being increased from 300 to 1000 ultimately. After the rubber was completely dissolved, the viscosity of the mixture amounted to 50 Poise, measured at 200°C and a rate of shear of 8 sec$^{-1}$.

EXAMPLE V

Example III was repeated, the difference being that the temperature amounted to 220°C, whilst, during the stirring, fresh air was passed over continuously. The vortex resulting from the high stirring speed drew this air into the oil.

The viscosity of the resulting solution amounted to 36 Poise, measured at 200 °C and a rate of shear of 8 sec$^{-1}$.

I claim:

1. Process for preparing a mixture of bitumen, selected from the group consisting of distillate-bitumen, blown bitumen, high-vacuum bitumen and mixed bitumen, a high-boiling hydrocarbon having a flash point of at least 200°C and a rubber-like copolymer of from 20 to 75% by weight of ethylene, 24 to 79% by weight of propylene and/or butylene-1 and of from 1 to 10% by weight, if necessary, of one or more polyenes, this process being characterized in that at a temperature of between 160° and 260°C bitumen is mixed with 0.1 to 25% by weight — referred to the bitumen — of the rubber-like copolymer in the form of a solution of this copolymer prepared at a temperature of between 160° and 260°C in 300 to 1000% by weight — referred to the copolymer — of the high-boiling hydrocarbon, which solution has a viscosity of at most 250 Poise, measured at 200°C.

2. Process according to claim 1, characterized in that as solution of the rubber-like copolymer a solution is applied of the rubber-like copolymer in 400 to 800% by weight — referred to this copolymer — of a high-boiling hydrocarbon or hydrocarbon mixture.

3. Process according to claim 1, characterized in that during the preparation of the solution of the copolymer in the high-boiling hydrocarbon, oxygen or oxygen-containing gas mixtures are contacted with the solution in a forced manner.

4. Process according to claim 3, characterized in that the oxygen-containing gases are contacted with the solution by continuous supply of oxygen or oxygen-containing gas and by increasing the area of contact between the solution and the gas supplied.

5. Process according to claim 3, characterized in that oxygen or oxygen-containing gases are led through the solution.

6. Process according to claim 1, characterized in that as copolymer a copolymer is applied containing dicyclopentadiene for polyene.

7. Process according to claim 6, characterized in that as high-boiling hydrocarbon or hydrocarbon mixture a hydrocarbon or hydrocarbon mixture is applied having a flash point of at least 200°C, preferably of at least 250°C.

8. Process according to claim 7, characterized in that as hydrocarbon mixture an aromatic-naphthenic hydrocarbon mixture is applied.

9. Process according to claim 8, characterized in that as hydrocarbon mixture a furfurol extract from lubricating oil fractions is applied.

10. Process according to claim 1, characterized in that a bitumen a distillate-bitumen is applied, in particular a distillate-bitumen having a penetration at 25°C of between 16 and 21 mm, a softening point (ring-and-ball) of between 37 and 44°C and a breaking point according to Fraass of at most −15°C.

11. Process according to claim 1, characterized in that in the mixture of bitumen, high-boiling hydrocarbon and rubber-like polymer also sulphur and/or a polyolefin is incorporated.

12. Process according to claim 11, characterized in that sulphur is applied in a quantity of between 1 and 4 parts by weight to every part by weight of rubber-like copolymer incorporated in the mixture.

13. Process according to claim 11, characterized in that for the polyolefin polyethylene is applied in a quantity of 1 to 3 parts by weight to every 100 parts of the mixture of bitumen and copolymer.

14. Product obtained by the process of claim 1.

* * * * *